United States Patent [19]

Cerni et al.

[11] Patent Number: 4,798,699

[45] Date of Patent: Jan. 17, 1989

[54] WEAR SLEEVE FOR A CONTROL ROD END PLUG

[75] Inventors: Samuel Cerni, Churchill Boro; John F. Wilson, Murrysville Boro; Robert K. Gjertsen, Monroeville, all of Pa.

[73] Assignee: Westinghouse Electric Corp., Pittsburgh, Pa.

[21] Appl. No.: 634,725

[22] Filed: Jul. 26, 1984

[51] Int. Cl.⁴ ............................................. G21C 7/10
[52] U.S. Cl. ................................................... 376/327
[58] Field of Search ............... 376/225, 327, 353, 447, 376/449, 451, 452

[56] References Cited

U.S. PATENT DOCUMENTS

| | | | |
|---|---|---|---|
| 2,879,216 | 2/1954 | Hurwitz et al. | 204/193.2 |
| 4,172,762 | 10/1979 | Anthony et al. | 376/327 |
| 4,284,475 | 8/1981 | Anthony | 376/353 |
| 4,292,132 | 9/1981 | Schukei et al. | 376/327 |
| 4,311,560 | 1/1982 | Verdone | 376/225 |
| 4,326,921 | 4/1982 | Cadwell | 376/353 |
| 4,391,771 | 7/1983 | Anthony | 376/451 |

FOREIGN PATENT DOCUMENTS 0091259  4/1968  France .
2255679  1/1982  France .

*Primary Examiner*—Harold J. Tudor
*Assistant Examiner*—Richard L. Klein

[57] ABSTRACT

A nuclear reactor includes a plurality of upstanding guide thimbles and a plurality of control rods received in the guide thimbles and supported for movement relative to the thimbles between inserted and withdrawn positions. The control rods each include a tubular cladding member and an end plug attached to a lower end of the member. The improvement relates to an wear sleeve disposed on the end plug so as to provide a contact interface between the control rod and its respective guide thimble. The sleeve is composed of material similar to that of the guide thimble and attached to the end plug by an interlock connection. The interlock connection includes a circumferential groove formed in the end plug and a circumferential protuberance swaged or mechanically roll formed in the sleeve so as to extend into the end plug groove.

3 Claims, 3 Drawing Sheets

WEAR SLEEVE FOR A CONTROL ROD END PLUG

CROSS REFERENCE TO RELATED APPLICATION

Reference is hereby made to the following co-pending U.S. patent application dealing with subject matter related to the present invention: "Control Rod End Plug with Stabilizing Configuration" by John F. Neilson et al, U.S. Ser. No. 634,729, filed July 26, 1984.

BACKGROUND OF THE INVENTION

1. Field of the Invention

The present invention relates generally to nuclear reactors having rods, such as of the control or water displacer type, reciprocable into and out of a reactor core and, more particularly, is concerned with a wear sleeve composed of the same material as the guide thimble within which the rod reciprocably moves and attached to an end plug on the rod composed of material dissimilar to the guide thimble material such that the wear sleeve provides the contact interface between the rod end plug and the guide thimble.

2. Description of the Prior Art

In a typical nuclear reactor, the reactor core is composed of a plurality of elongated fuel assemblies each of which contains a plurality of elongated fuel elements or rods. A liquid coolant is pumped upwardly through the core in order to extract heat generated in the core for the production of useful work. The heat output of the core is usually regulated by the movement of control rods containing neutron absorbing material such as $B_4C$, or by movement of water displacer rods such as the ones described in U.S. Pat. No. 4,432,934. In reactors of the pressurized-water type, each fuel assembly typically includes a plurality of cylindrical guide tubes or thimbles through which the cylindrical control rods or water displacer rods are reciprocably moved. Some of the coolant flow is usually diverted into the lower end of the guide thimble in order to cool the control rod. The control rod ordinarily generates heat in the nuclear transformation associated with its neutron absorbing function.

During power operation of the reactor, most of the regulating control rods are maintained substantially withdrawn from the reactor core and thus disposed in withdrawn positions in which the lower end plug tips of the control rods are within the upper ends of the guide thimbles. While in such withdrawn positions, the control rods may experience significant vibration induced by coolant water flow within the guide thimbles which results in oscillatory contact of the rod end plug tips against the internal wall surfaces of the guide thimbles and wear on these surfaces. Continuous wear of the guide thimble walls can lead to perforation of the thimbles and significant weakening of the fuel assembly structure.

Thus, there has arisen the need to significantly mitigate the affects of the control rod vibrations so as to bring guide thimble wear under control. Two approaches to solving this problem are disclosed in U.S. Pat. Nos. to Schukei et al (U.S. Pat. No. 4,292,132) and Verdone (U.S. Pat. No. 4,311,560). Both of these approaches have as a common objective the elimination of wear on the guide thimble wall by preventing vibratory contact of the control rod against its adjacent guide thimble wall. In the Verdone approach, a spring device is added to the lower end of the control rod which provides a uniform, resilient interference fit against the guide thimble wall and thereby prevents the rod tip from impacting the guide thimble wall. In the Schukel et al approach, the control rod has a hydraulic bearing formed at its lower tip which produces forces which counteract forces tending to drive the control rod tip against the guide thimble wall. In such manner, contact of the control rod against the guide thimble wall and resultant wear thereon are substantially avoided.

While the approaches taken in these two patents operate reasonably well and achieve their objectives under the range of operating conditions for which they were designed, a need exists for an alternative approach to the wear problem which is simplier and less costly in its design and construction and is more reliable in its performance over the long term.

SUMMARY OF THE INVENTION

The present invention provides a wear sleeve on the lower end plug of the rod designed to satisfy the aforementioned needs. Unlike the prior art approaches which prevent vibratory contact with the guide thimble wall by interposing a device which either maintains continuous contact with the wall or prevents any contact at all from occurring, the present invention allows vibratory contact with the guide thimble wall, but provides the insert sleeve at the contact interface. Since the rate of wear is influenced to a large degree by the materials at the contacting interface, the sleeve in being composed of the same material as the guide thimble greatly reduces wear potential at the contact interface over that experienced heretofore between the dissimilar materials of the thimble and the rod lower end plug. The wear sleeve is simply and reliably attached to the rod end plug by means of a single circumferential countersink or protuberance swaged or mechanically rolled into the wear sleeve so as to extend into an annular groove circumferentially formed in the rod end plug.

Accordingly, the present invention sets forth in a nuclear reactor including a plurality of upstanding guide thimbles, a plurality of control rods received in the guide thimbles and means supporting the control rods for movement relative to the thimbles between inserted and withdrawn positions, a wear sleeve disposed on an end plug attached to an end of each tubular cladding member of the control rod for providing a contact interface between the control rod and its respective guide thimble. On the one hand, the end plug and cladding member of the control rod are formed of the same material, such as zircaloy, while, on the other hand, the wear sleeve and guide thimble are formed of the same material, such as stainless steel. The end plug is rigidly attached and sealed to the end of the cladding member by a girth weld. Preferably, the wear sleeve is inserted about the end plug to a position where an inner end of the sleeve is spaced a short distance from the girth weld. The wear sleeve has generally the same outside diameter as the cladding member. Attachment of the sleeve is accomplished by an interlock connection in the form of a single circumferential countersink swaged mechanically rolled at a location intermediately between the ends of the sleeve into a circumferential groove formed near the inner end of the end plug. A single swaged countersink or protuberance is desirable in order to eliminate axial thermal mismatch between the dissimilar materials of the sleeve and the end plug. In the alternative, the sleeve is mechanically rolled so as to capture the sleeve on the end plug and provide a diametric gap therebetween such that some relative diametric movement is available in creating a dampening effect. An interlock connection is used, rather than a weld, because dissimilar metals cannot be welded together.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1:
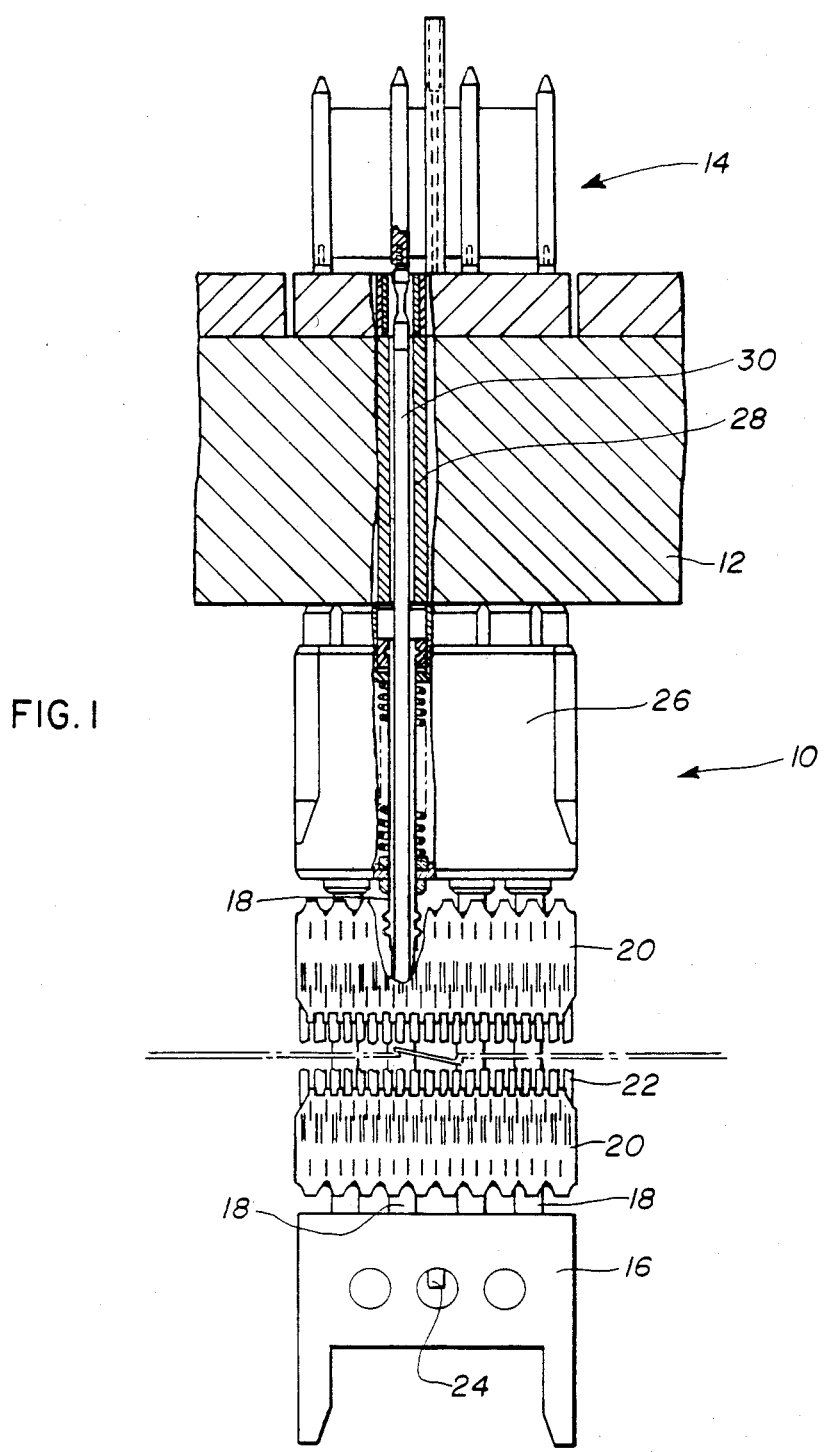
FIG. 1 is an elevational view of a fuel assembly with control rods supported so as to extend down into guide thimbles of the assembly, the latter being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an overall combination of a fuel assembly, generally designated by the numeral 10, an upper core support plate 12 disposed above and extending across the top of fuel assembly 10, and a spider assembly 14 disposed above the upper core support plate. Each of these components will be described and discussed separately.

The fuel assembly 10, being shown in a vertically foreshortened form in FIG. 1, basically includes a lower end structure or bottom nozzle 16 for supporting the assembly on a lower core plate (not shown) in the core region of a reactor (not shown) and a number of longitudinally extending guide tubes or thimbles 18 which project upwardly from the bottom nozzle 16. The assembly 10 further includes a plurality of transverse grids 20 axially spaced along the guide thimbles 18 and an organized array of elongated fuel rods 22 transversely spaced and supported by the grids 20. Finally, the assembly 10 has an instrumentation tube 24 located in the center thereof and an upper end structure or top nozzle 26 attached to the upper ends of the guide thimbles 18. With such arrangement of parts, the fuel assembly 10 forms an integral unit capable of being conventionally handled without damaging the assembly parts. Since the fuel assembly 10 does not form a part of the present invention and is merely for illustrational purposes, any further description thereof is unnecessary and thus will not be given. For a more detailed description of the fuel assembly 10, reference should be made to the pending patent application of Robert K. Gjertsen et al, entitled "Nuclear Reactor Fuel Assembly with Improved Top Nozzle and Hold Down Means"; filed Oct. 17, 1983; and assigned U.S. Ser. No. 542,625.

The upper core support plate 12, being conventional, extends across the top of the fuel assembly 10 as well as across the top of other identical fuel assemblies (not shown) arranged within the core. For the sake of brevity, it should suffice to say that the core plate 12 has a multiplicity of flow openings 28 (only one of which is seen in FIG. 1) to allow coolant to pass upwardly through the core, and that at least some of these openings are aligned over the guide thimbles 18 such that control rods 30 can pass down through the core plate 12 and be inserted into the guide thimbles 18 of the fuel assembly 10.

Connected to the upper ends of the control rods 30 is the spider assembly 14 which supports the rods for vertical movement within the guide thimbles 18 by a conventional drive mechanism (not shown). In the illustrated embodiment, the spider assembly 14 is disposed above the core plate 12 and is restably supported thereon when the control rods 30 are fully inserted in the guide thimbles 18 as seen in FIG. 1. In other arrangements, the spider assembly is located between the bottom of the upper core plate and the top of the fuel assembly.

Figure 2:
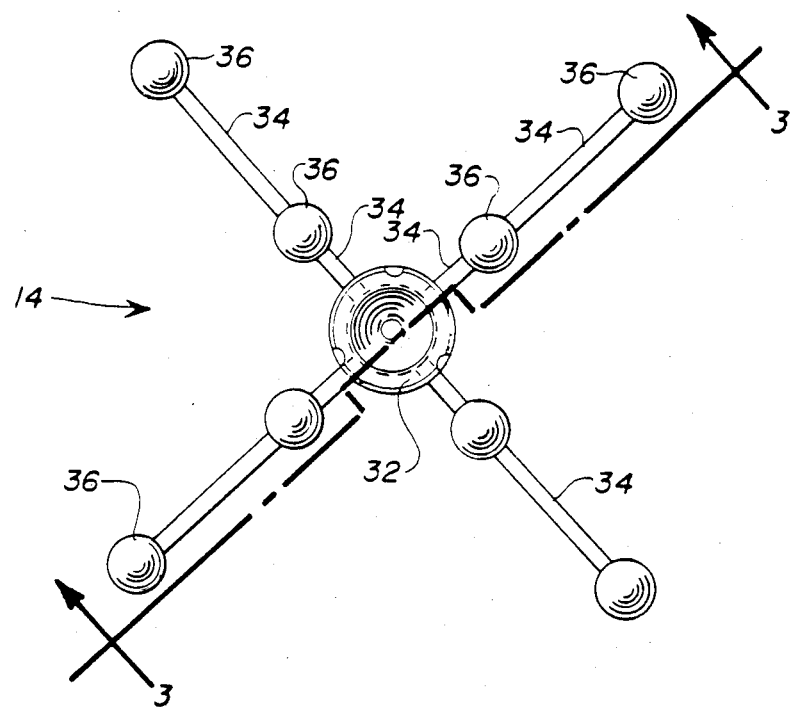
FIG. 2 is an enlarged, top plan view of a spider assembly which includes the control rods.
Figure 3:
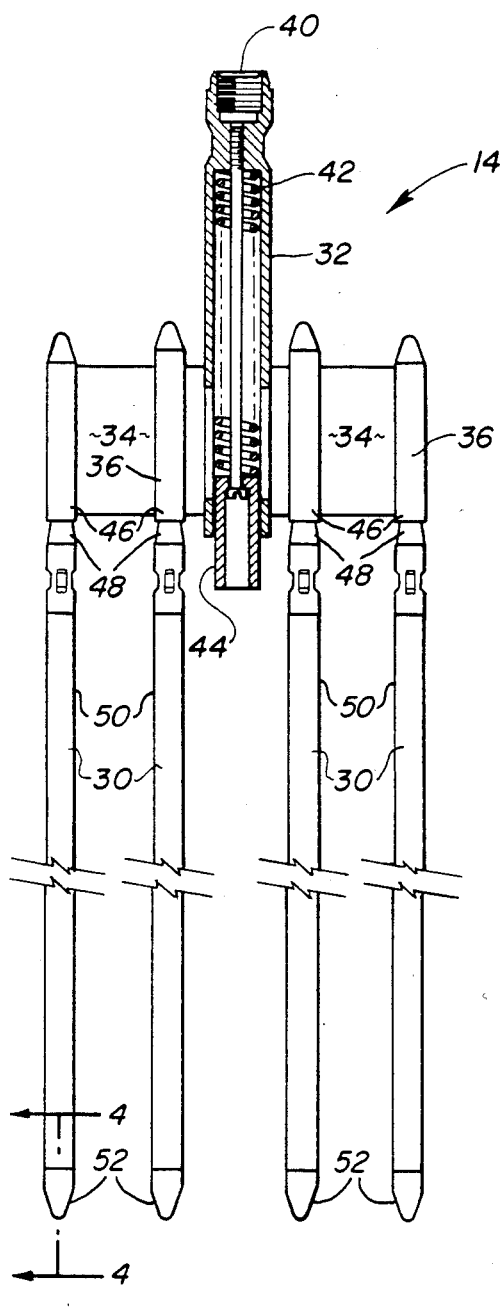
FIG. 3 is a sectional view or the spider assembly as taken along line 3—3 of FIG. 2.

As best seen in FIGS. 2 and 3, the spider assembly 14 basically includes a central hub 32, a plurality of vanes 34 radially extending outwardly from the hub 32, and a plurality of fingers 36 associated with the vanes 34 for connection with the upper ends of the control rods 30. The central hub 32 is preferably in the form of an elongated cylindrical tube having on its upper end an internally threaded segment 40 for connection with the drive mechanism (not shown) which vertically raises and lowers the spider assembly 14 and the control rods 30 therewith in a conventional manner. The tubular hub 32 houses a common load absorbing mechanism which includes a coil spring 42 held in a state of compression and a nipple 44 which seats in a shallow cavity (not shown) provided in the top surface of the core plate 12 to assist in proper alignment of the control rods 30 within the core plate openings 28 and the guide thimbles 18. As is well known, the primary purpose of such a load absorbing mechanism is to prevent shock loading of the core plate 12, as well as the fuel assembly 10, as the spider assembly 14 abuts the top of the core plate 12 when the control rods 30 are fully inserted in the guide thimbles 18.

As seen in FIG. 3, each control rod 30 is supported by one of the elongated fingers 36 of the spider assembly 14. The lower end 46 of each finger 36 is drilled and internally threaded for connection with the upper end 48 of one control rod 30. Each control rod 30 includes an elongated tubular cladding member 50 and an end plug 52 attached to the lower end 54 (see FIG. 4) of the cladding member. In some control rod designs, a plurality of pellets 56 of neutron absorbing material are arranged in an end-to-end stack within the cladding member 50. In other control rod designs, the pellets are of a material which does not absorb neutrons (water displacer rods) and the control of the reactor is achieved by the displacment of the water moderator as described in the above-mentioned U.S. Pat. No. 4,432,934.

As mentioned earlier, the power level of the reactor is usually regulated by the insertion and withdrawal of the control rods 30 into and from the guide thimbles 18. The control rods 30 are fully inserted during reactor shutdown, and some are withdrawn when the reactor is operating at full power. However, even in their withdrawn positions, the control rods 30 still extend into the upper end of the guide thimbles 18 a short distance, such as six inches or so. When the control rods 30 are fully inserted into the guide thimbles 18, and thus within the reactor core (not shown), they will generate heat.

Provision is made for cooling the control rods to prevent the pellets therein from melting. Typically, the lower portions of the guide thimbles have openings (not shown) whereby some of the pumped coolant entering the bottom of the fuel assembly 10 is diverted into the thimbles 18 and flows upwardly therein over the control rods 30. As previously mentioned, particularly when the control rods 30 are in their withdrawn positions, the flow of water upwardly through the thimbles 18 past the partially inserted control rods induces vibratory motion in the lower ends of the rods which, absent the present invention, produces vibratory contact of their end plugs 52 with the internal wall of the thimbles 18.

Wear Sleeve on Control Rod End Plug

Heretofore, the vibratory contact has taken place at the interface of dissimilar materials and excessive wear has occurred as a result. For instance, in certain reactors stainless steel control rod lower tips contact a zircaloy thimble wall, producing excessive wear of the zircaloy wall. In other reactors the thimbles are made of stainless steel and the control rods of zircaloy. Irrespective of which material is used to fabricate which part, it is vibratory contact of two dissimilar materials which causes excessive wear.

Figure 5:
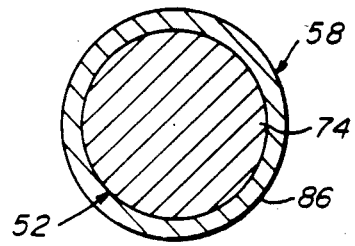
FIG. 5 is an enlarged, sectional view of the wear sleeve and end plug as taken along line 5—5 of FIG. 4.
Figure 4:
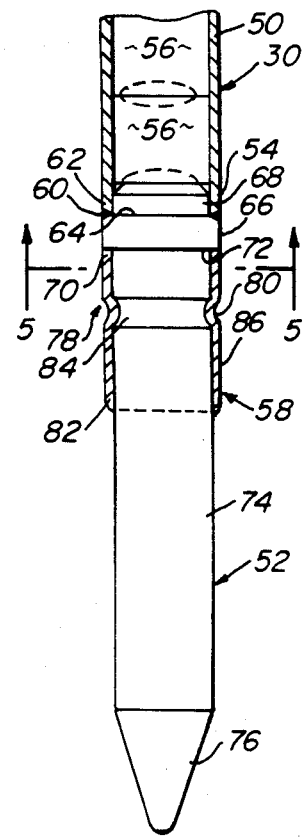
FIG. 4 is an enlarged, fragmentary view of an end of the control rod containing an end plug with the wear sleeve of the present invention inserted thereon as taken along line 4—4 of FIG. 3.

Referring now to FIGS. 4 and 5, the present invention provides a wear sleeve 58 at the contact interface of the control rod 30 with the guide thimble 18 which is composed of the same material as the guide thimble. In the illustrated embodiment of the fuel and spider assemblies 10,14, the guide thimble 18 is composed of stainless steel, while the cladding member 50 and end plug 52 of the control rod 30 are formed of zircaloy. Therefore, the wear sleeve 58 is composed of stainless steel.

As in the past, the end plug 52 is rigidly attached and sealed to the lower end 54 of the cladding member 50 by a girth weld 60. Now, the weld 60 is formed at the circumferential location of contact between the lower edge 62 of the cladding member 50 and a shoulder 64 on the end plug 52 formed at the merger of a narrow annular segment 66 and an inner end 68 of the plug. The outside diameter of the plug segment 66 is substantially the same as the outside diameter of the cladding member 50.

As seen in FIG. 4, the wear sleeve 58 is inserted about the end plug 52 to a position where an inner end 70 of the sleeve abuts another shoulder 72 on the end plug 52 which is located a short distance from the girth weld 60. The shoulder 72 is formed at the merger of the annular segment 66 and an elongated body 74 of the end plug which has an outside diameter generally the same as that of the inner end 68 of the plug, that being slightly less than the inside diameter of the cladding member 50. In such position, the wear sleeve 58, having a cross sectional shape concentric with that of said end plug body 74, encircles the elongated plug body, as seen in FIG. 5, and extends along it through approximately one-third of the length of the body toward an outer tapered end 76 of the plug 52, as seen in FIG. 4. The wear sleeve 58 has generally the same outside diameter as the cladding member 50.

Attachment of the sleeve 58 to the end plug 52 is accomplished by an interlock connection, generally designated 78, composed of a single circumferential countersink or protuberance 80 swaged or mechanically roll formed at a location intermediately between the inner end 70 and an outer end 82 of the sleeve 58. The protuberance 80 extends into a circumferential groove 84 machined or otherwise suitably formed in the plug body 74 at a location spaced outwardly from the shoulder 72 on the annular segment 66 of the plug 58. A single swaged protuberance 80 is desirable in order to eliminate axial thermal mismatch between the dissimilar materials of the sleeve 58 and the plug 52. Also, an interlock connection is used, rather than a weld, because of the difficulty of welding dissimilar materials together.

Figure 6:
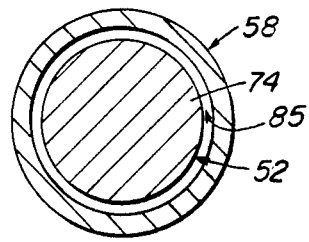
FIG. 6 is a sectional view similar to that of FIG. 5, but showing an alternative embodiment in which a small diametric gap is provided between the wear sleeve and end plug.

In the preferred embodiment, the sleeve 58 snugly contacts the end plug 52: however, the sleeve 58 may only loosely contact the end plug in thereby providing a small diametric gap 85 between the inner wall of the sleeve 58 and the outer surface of the end plug 52, as seen in FIG. 6. Such gap would allow some relative diametric movement beween the wear sleeve and the end plug in thereby providing a dampening mechanism if vibration occurred. With such loose bit arrangement, when the end plug impacts the thimble, water is "squeezed" out as the sleeve moves relative to the end plug. This action would occur for every impact thereby providing a dampening effect which should reduce the impact force and, hence, wear.

The vibratory contact between the guide thimble 18 and the control rod 30 now takes place at the interface provided by the exterior surface 86 of the wear sleeve 58 mounted on the end plug 52. Since in the illustrated embodiment, a stainless steel-to-stainless steel wear couple is provided at the interface, the degree of wear should be minimized over that experience heretofore.

It is thought that the wear sleeve of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear reactor including at least one guide thimble and at least one control rod received in said guide thimble and supported for movement relative thereto, said control rod having an elongated tubular cladding member and an end plug attached to an end of said member which extends into said guide thimble and is subject to vibratory contact with a portion of said guide thimble, the improvement which comprises:

a wear sleeve surrounding an upper portion of said end plug adjacent said end of said cladding member of said control rod and disposed above a lower tip portion of said end plug so as to provide a contact interface between said end plug and said guide thimble portion, said wear sleeve having a cross sectional shape concentric with that of said end plug upper portion, said wear sleeve having means forming a connection with complementary means on said end plug for attaching said wear sleeve to said end plug upper portion and being composed of material similar to that of said thimble and dissimilar from that of said end plug.

2. In a nuclear reactor including at least one guide thimble and at least one control rod received in said guide thimble and supported for movement relative thereto, said control rod having an elongated tubular cladding member and an end plug attached to an end of said member which extends into said guide thimble and is subject to vibratory contact with a portion of said guide thimble, the improvement which comprises:

a wear sleeve surrounding an upper portion of said end plug adjacent said end of said cladding member of said control rod and disposed above a lower tip portion of said end plug so as to provide a contact interface between said end plug and said guide thimble portion, said wear sleeve having a cross sectional shape concentric with that of said end plug upper portion, said wear sleeve being composed of material similar to that of said thimble and dissimilar from that of said end plug, said wear sleeve being attached to said end plug upper portion by an interlock connection which includes a circumferential groove formed in said end plug upper portion and a circumferential protuberance formed in said wear sleeve and extending into said groove.

3. In a nuclear reactor including at least one guide thimble and at least one control rod received in said guide thimble and supported for movement relative thereto, said control rod having an elongated tubular cladding member and an end plug attached to an end of said member which extends into said guide thimble and is subject to vibratory contact with a portion of said guide thimble, the improvement which comprises:

a wear sleeve surrounding an upper portion of said end plug adjacent said end of said cladding member of said control rod and disposed above a lower tip portion of said end plug so as to provide a contact interface between said end plug and said guide thimble portion, said wear sleeve having a cross sectional shape concentric with that of said end plug upper portion, said wear sleeve being composed of material similar to that of said thimble and dissimilar from that of said end plug, said wear sleeve being attached to said end plug upper portion by an interlock connection which includes a circumferential groove formed in said end plug upper portion and a circumferential protuberance formed in said wear sleeve and extending into said groove with a diametric gap being defined between said wear sleeve and said end plug so as to allow some relative diametric movement therebetween which thereby creates a dampening mechanism should vibration occur.

* * * * *